United States Patent

Shimura et al.

[11] Patent Number: 5,933,249
[45] Date of Patent: Aug. 3, 1999

[54] IMAGE PROCESSING APPARATUS AND METHOD

[75] Inventors: Norio Shimura, Yokohama; Tadashi Yoshida, Ichikawa; Mitsuru Maeda, Yokohama; Yoshihiro Ishida, Kawasaki, all of Japan

[73] Assignee: Canon Kabushiki Kaisha, Tokyo, Japan

[21] Appl. No.: 08/944,424

[22] Filed: Oct. 6, 1997

Related U.S. Application Data

[63] Continuation of application No. 08/357,380, Dec. 16, 1994, abandoned.

[30] Foreign Application Priority Data

Dec. 27, 1993 [JP] Japan .................................. 5-332011
Dec. 27, 1993 [JP] Japan .................................. 5-332013
Oct. 31, 1994 [JP] Japan .................................. 6-267568

[51] Int. Cl.$^6$ .................................................. H04N 1/41
[52] U.S. Cl. ........................... 358/429; 382/284; 382/176
[58] Field of Search .................................... 382/284, 232, 382/243, 166, 176; 358/540, 450, 462, 467, 539, 522, 426, 429, 432, 433, 524

[56] References Cited

U.S. PATENT DOCUMENTS

| | | | |
|---|---|---|---|
| 5,086,487 | 2/1992 | Katayama et al. | 382/56 |
| 5,124,811 | 6/1992 | Ohsawa | 358/448 |
| 5,128,748 | 7/1992 | Murakami et al. | 358/500 |
| 5,136,396 | 8/1992 | Kato et al. | 358/426 |
| 5,138,672 | 8/1992 | Hirabayashi et al. | 382/54 |
| 5,153,749 | 10/1992 | Katayama | 358/448 |
| 5,159,468 | 10/1992 | Yoshida et al. | 358/451 |
| 5,309,524 | 5/1994 | Hirabayashi et al. | 382/47 |
| 5,317,411 | 5/1994 | Yoshida | 358/261.2 |
| 5,331,426 | 7/1994 | Kato et al. | 358/426 |
| 5,361,147 | 11/1994 | Katayama et al. | 358/532 |
| 5,363,219 | 11/1994 | Yoshida | 358/539 |
| 5,436,981 | 7/1995 | Ishikawa | 382/173 |
| 5,570,432 | 10/1996 | Kojima | 382/254 |

Primary Examiner—Amelia Au
Assistant Examiner—Vikkram Bali
Attorney, Agent, or Firm—Fitzpatrick, Cella, Harper & Scinto

[57] ABSTRACT

One object of the present invention is to cut out areas of different natures from an image hierarchically. For encoding, an area identifier identifies areas of an input image. A multivalued area is encoded in a multivalued encoding mode. As for a bicolor area, typical-color values are computed and then encoded in a binary encoding mode. For decoding, multivalued coded data is decoded in a multivalued decoding mode. As for binary-coded data, values of pixels of a binary image resulting from binary decoding are transformed into multivalued data using associated typical-color values. The multivalued data is structured according to structural information, wherein areas of the data may be superposed mutually. Thus, an image is reconstructed.

8 Claims, 15 Drawing Sheets

|  | x. | y. | Δx. | Δy. | ATTRIBUTE |
|---|---|---|---|---|---|
| ① : | 10. | 10. | 80. | 140. | 0 (BICOLOR CHARACTER AREA) |
| ② : | 100. | 10. | 140. | 70. | 1 (BLACK-AND-WHITE CHARACTER AREA) |
| ③ : | 100. | 90. | 50. | 90. | 1 |
| ④ : | 160. | 90. | 80. | 90. | 2 (NATURAL-COLORED AREA) |
| ⑤ : | 10. | 160. | 80. | 80. | 2 |
| ⑥ : | 100. | 190. | 140. | 50. | 0 |

▦ : BLACK-AND-WHITE CHARACTER AREA
⊠ : BICOLOR CHARACTER AREA
▧ : NATURAL-COLORED AREA

STRUCTURAL INFORMATION

① (110,90)   140×35   CHARACTER AREA

② (60,40)    240×130  NATURAL-COLORED AREA

HIERARCHICAL INFORMATION

① IS FULLY SUPERPOSED ON ②.

TYPICAL-COLOR VALUE (R.G.B) = ( 0.  50.  200 )

(R.G.B) = (100. 200.  50 )

STRUCTURAL INFORMATION

① (40,50), 180×30, CHARACTER AREA

② (70,50), 120×90, CHARACTER AREA

③ (165,50), 180×30, CHARACTER AREA

④ (170,90), 135×65, NATURAL-COLORED AREA

STRUCTURAL INFORMATION

① (40,50), 180×30, CHARACTER AREA

② (170,90), 135×65, NATURAL-COLORED AREA

HIERARCHICAL INFORMATION

② IS FULLY SUPERPOSED ON ①.

STRUCTURAL INFORMATION

① (90,60) 180×120 NATURAL-COLORED AREA

STRUCTURAL INFORMATION

① (90,60)  180×120  NATURAL-COLORED AREA
② (110,95) 140×60   CHARACTER AREA

HIERARCHICAL INFORMATION

PIXELS IN ② REPRESENTED BY 1'S ARE SOLELY SUPERPOSED ON ①.

(r.g.b) = (Rb.Gb.Bb)

($\Delta$x.$\Delta$y) = (Xb.Yb)

FIG. 21

| BINARY DIGIT | | TYPICAL-COLOR VALUE |
|---|---|---|
| R : | 0 → | 250 |
|  | 0 → | 30 |
| G : | 0 → | 10 |
|  | 0 → | 250 |
| B : | 0 → | 30 |
|  | 0 → | 250 |

FIG. 22

| RGB BINARY DIGIT (THREE BIT DATA) | EIGHT COLORS RENDERED BY TYPICAL-COLOR VALUES |
|---|---|
| ( R. G. B ) | ( R. R. R ) |
| ( 0. 0. 0 ) | ( 250. 10. 30 ) |
| ( 0. 0. 1 ) | ( 250. 10. 160 ) |
| ~ | ~ |
| ( 1. 1. 0 ) | ( 30. 200. 30 ) |
| ( 1. 1. 1 ) | ( 30. 200. 160 ) |

DESIGNATED COLOR

BLUE : (r,g,b) = (0,0,255)
RED : (r,g,b) = (255,0,0)

IMAGE PROCESSING APPARATUS AND METHOD

This application is a continuation of application Ser. No. 08/357,380 filed Dec. 16, 1994, now abandoned.

BACKGROUND OF THE INVENTION

1. Field of the Invention

The present invention relates to an image processing apparatus and method having a function of handling multi-valued image data as structured coded data.

2. Description of the Related Art

In the past, there has been a technique of encoding an image in which characters and photographs coexist. Herein, an image is cut into rectangular areas of different natures, and then an encoding mode is determined for each area according to the nature of the area: for example, a binary encoding mode including an MMR mode is determined for a character area; and a so-called JPEG adaptable discrete cosine transform (ADCT) encoding mode is determined for a photography area.

However, as long as the above conventional technique is concerned, if an area in which characters are superposed on a photograph is handled, the area is encoded as a natural-colored area. This results in degraded character quality or deteriorated encoding efficiency.

In general, areas are cut out in the form of rectangles. When it comes to an area in which characters or photographs are congested, areas cannot be cut out successfully. For example, a character may be present as part of an area cut out as a natural-colored image. Thus, efficient encoding is disabled from time to time.

According to known art, characters or drawings in image data are converted into binary data and then encoded. After the coded data is decoded, multivalued information (having, for example, 256 gray-scale levels ranging from 0 to 255) is provided. In this case, a value of a pixel represented by a binary digit 0 is defined as 255 and a value of a pixel represented by a binary digit 1 is defined as 0. Thus, pixel values are provided as multivalued information by means of a display, output equipment such as a printer, or the like.

However, the above technique poses a problem in that since binary-coded characters and drawings are defined with 0s or 255s, if they are output as multivalued information, areas containing them appear unnatural. Consequently, unclear characters or color characters are rendered as black characters or specific-color characters.

In recent years, color images in which characters or a logo is laid out on a background having a uniform color (for example, green) different from the color (for example, red) of the characters or logo, have been widely adopted. Such a bicolor area of an image which consists of two colors (a base color plus another color) has been treated as a multivalued color image in the past. This poses a problem in that the amount of the image data is enormous or that encoding or decoding brings about degradation of image quality.

SUMMARY OF THE INVENTION

An object of the present invention is to solve the aforesaid problems; that is, to realize efficient encoding by dividing an image into areas of different natures.

For achieving this object, according to the present invention, there is provided an image processing apparatus comprising:

input means for inputting multi-level image data;

extracting means for extracting a first and a second area from an image represented by the multi-level image data;

first encoding means for encoding multi-level image data in the first area by using a multi-level encoding method;

second encoding means for encoding multi-level image data in the second area by using a binary encoding method; and generating means for generating position information of at least one of the first and the second areas.

Another object of the present invention is to structure image data hierarchically by dividing the image data into areas while permitting superposition of areas.

For achieving this object, according to the present invention, there is provided an image processing apparatus comprising:

input means for inputting multi-level image data;

extracting means for extracting structure information from an image represented by the multi-level image data; and encoding means for encoding the multi-level image data by using a plurality of encoding methods based on the structure information.

Still another object of the present invention is to provide an efficient encoding technique for color image data.

Yet another object of the present invention is to enable efficient storing or editing of image data.

Other objects and working modes of the present invention will be apparent from the following detailed description based on the drawings and the contents of the claims.

BRIEF DESCRIPTION OF THE DRAWINGS

FIG. 21 shows how to compute typical color values of pixels in accordance with the fourth variant;

FIG. 22 shows typical color values of pixels associated with binary data in accordance with the fifth variant;

DETAILED DESCRIPTION OF THE PREFERRED EMBODIMENTS

Referring to the appended drawings, the preferred embodiments of the present invention will be described in detail.

First Embodiment

Figure 1:
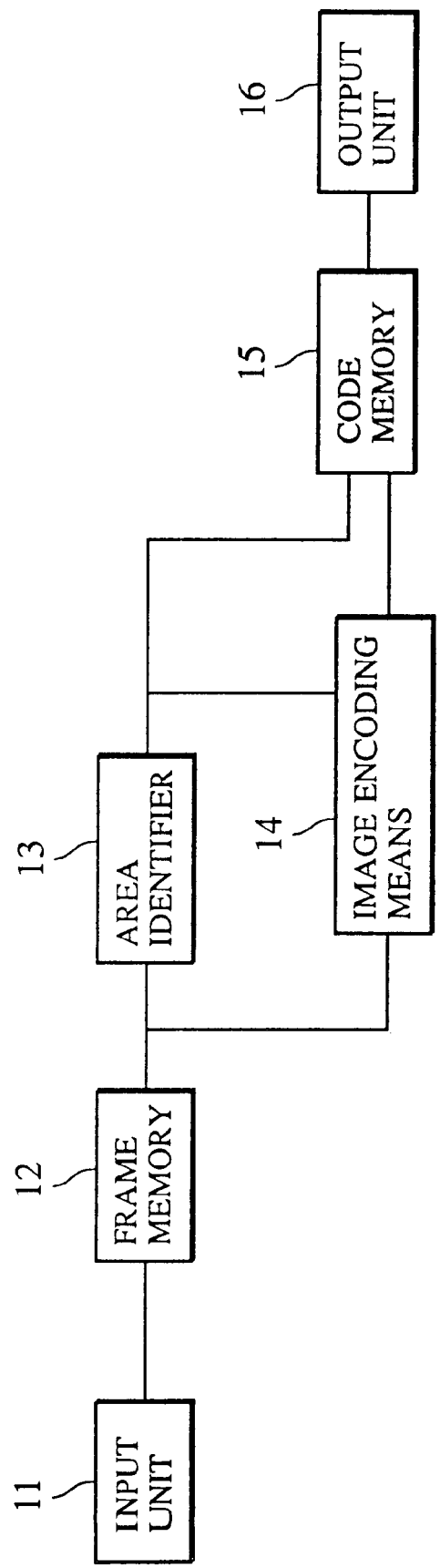
FIG. 1 is a block diagram showing an image encoding unit, which constitutes an image processing apparatus, in accordance with an embodiment of the present invention.

FIG. 1 is a block diagram showing an image encoding unit which constitutes an image processing apparatus in accordance with an embodiment of the present invention. In FIG. 1, reference numeral 11 denotes an input unit for inputting an image to the image encoding unit. 12 denotes a frame memory for storing input images composing at least one screen. 13 denotes an area identifier for identifying image areas as described later. 14 denotes an image encoding means for encoding an image according to an encoding mode as described later. 15 denotes a code memory. 16 denotes an output unit for communicating or accumulating coded data.

Figure 2:
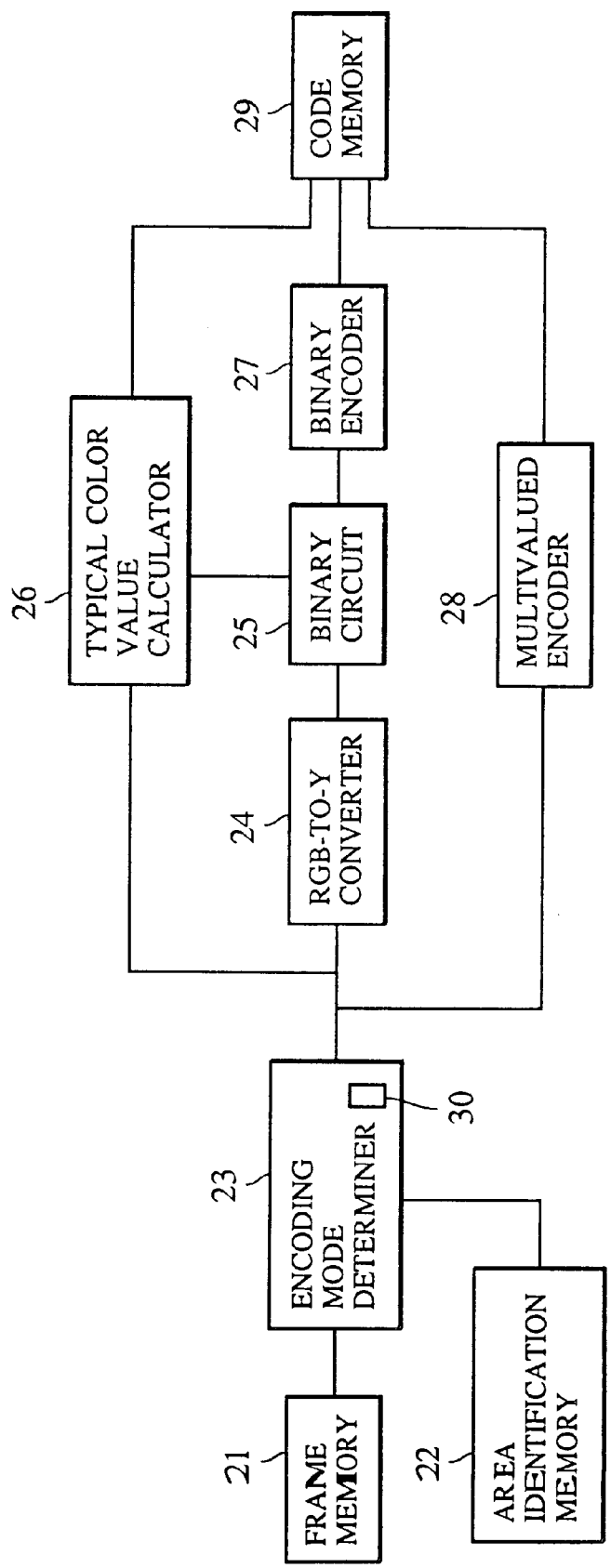
FIG. 2 is a block diagram showing circuitry of an area identifier 13 and an image encoding means 14 in the image encoding unit in accordance with the embodiment of FIG. 1.

FIG. 2 is a block diagram showing circuitry of the area identifier 13 and the image encoding means 14 shown in FIG. 1. As shown in FIG. 2, reference numeral 21 denotes a frame memory functioning as a memory. 22 denotes an area identification memory in which results of area identification made by the area identifier are placed. 23 denotes an encoding mode determiner. 30 denotes an area reshaper. 24 denotes an RGB-to-Y converter for converting sets of red (R), green (G), and blue (B) values of image data into Y values. 25 denotes a binary circuit. 26 denotes a typical color value calculator, which will be described later, for computing typical color values of pixels. 27 denotes a binary encoder for handling a join bi-level image group (JBIG). 28 denotes a multivalued encoder for handling a joint photographic expert group (JPEG). 29 denotes a code memory comparable to the code memory 15 in FIG. 1.

Description of the Image Encoding Unit

The image encoding unit which constitutes an image processing apparatus in accordance with this embodiment will be described below.

An image is entered at the input unit 11 in FIG. 1 and then stored in the frame memory 12. The area identifier 13 then divides, as shown in FIG. 4, the input image data existent in the frame memory 12 into rectangular areas of different natures, and then places structural information in the area identification memory 22 shown in FIG. 2.

Area identification executed by the area identifier 13 shown in FIG. 1, or more particularly, by the encoding mode determiner 23 shown in FIG. 2 is such that: input image data is divided into, for example, blocks each having a size of 16 by 16 pixels; histograms are plotted for R (red), G (green), and B (blue) values of data of each block; and then blocks for which each histogram demonstrates a distribution having two peaks are recognized as bicolor areas, and blocks for which each histogram demonstrates a discrete distribution are recognized as multivalued areas.

Figure 4:
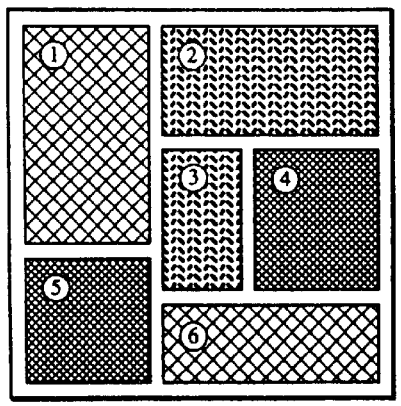
FIG. 4 shows structured image data and structural information.

When receiving the results of identification, the area reshaper 30 incorporated in the encoding mode determiner 23 recognizes blocks of the same nature as areas of the same types, describes structural information representing the locations and sizes of the areas in the area identification memory 22, and renders image data according to the format shown in FIG. 4.

Figure 5:
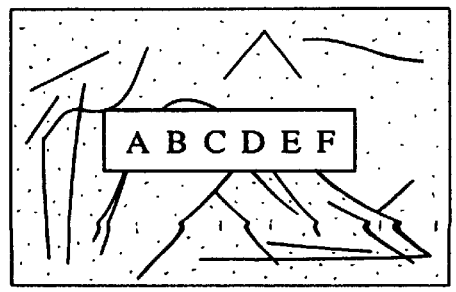
FIG. 5 shows an example of an image in which a character area is superposed on a natural-colored area.

FIG. 5 shows an example of an image in which a character area is superposed on a natural-colored area. According to a conventional processing method, a whole natural-colored area including a character area is handled as a natural-colored area. This results in deteriorated characters and an increased quantity of encoding.

Figure 6:
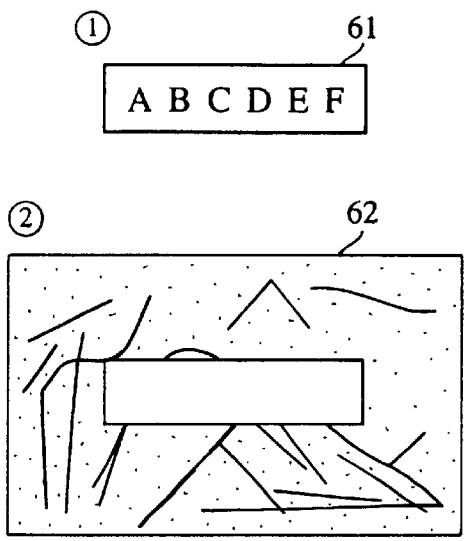
FIG. 6 is an explanatory diagram concerning processing of an image in which a character area is superposed on a natural-colored area.

In the apparatus of this embodiment, superposition of areas is permitted. As shown in FIG. 6, rectangular areas can be structured hierarchically.

To be more specific, for a natural-colored area from which a character area is cut out (an image 62 in FIG. 6), the area reshaper 30 colors the portion of the natural-colored area corresponding to the character area in white. The multivalued encoder 28, which is responsible for multivalued encoding, such as adaptive discrete cosine transform (ADCT) encoding as established by the JPEG and located in a succeeding stage, performs multivalued encoding. During ADCT, an orthogonal transform is performed in units of a given number of two-dimensional blocks, and thus quantization is carried out. This results in efficient encoding of multivalued data. The employment of irreversible encoding helps improve encoding efficiency. Alternatively, the portion of the natural-colored area corresponding to the character area is padded with values of pixels surrounding the portion (thus, interpolated), and then encoded. That is, the value of an object pixel is changed in accordance with the values of neighboring pixels.

For superposition of areas, when a portion of a natural-colored area corresponding to a character area is padded with values of surrounding pixels and then encoded, image quality seems to be adversely affected to a more limited extent.

For the aforesaid superposition of areas, hierarchical information representing a relationship between superposed areas is added to structural information shown in FIG. 4. In the case of an image shown in FIG. 5, information saying "A character area is superposed on a natural-colored area." is appended (refer to "Hierarchical information" in FIG. 6).

Next, the image encoding means 14 encodes each area independently according to the nature of the area.

To begin with, encoding of a bicolor area containing characters or drawings, a graph, or the like will be described. The RGB-to-Y converter 25 computes brightness (Y) values by converting sets of R, G, and B values of image data of such a bicolor area. The binary circuit 25 transforms the brightness (Y) values into binary digits. The threshold used for this binary transform action may be computed using a histogram concerning the brightness (Y) values. Alternatively, a user of the apparatus may use a display 81 and an operation unit 82 to determine the threshold interactively. The procedure for determining a threshold is not restricted to any particular method. Incidentally, image edge enhancement may be executed as preprocessing for the binary transform.

The typical color value calculator uses the thus obtained binary digits to compute a typical color value for each of plural pixels, whose R, G, and B values are represented by binary digits 0s and 1s. Specifically, typical color value computing is such that R, G, and B values of pixels represented by binary digit 0s are averaged and R, G, and B values of pixels represented by binary digit 1s are averaged. Alternatively, maximum values of histograms concerning R, G, and B values may be adopted. The calculation of typical color values is not restricted to any procedure.

Figure 7:
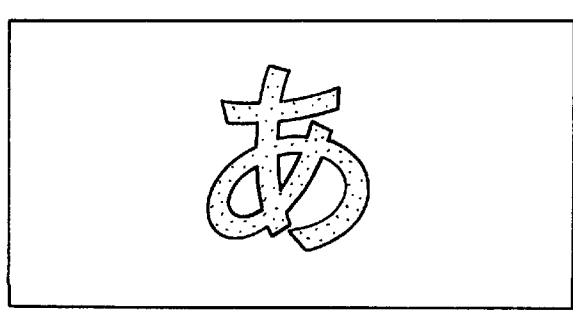
FIG. 7 shows typical color values of a binary area.
Figures 8, 9:
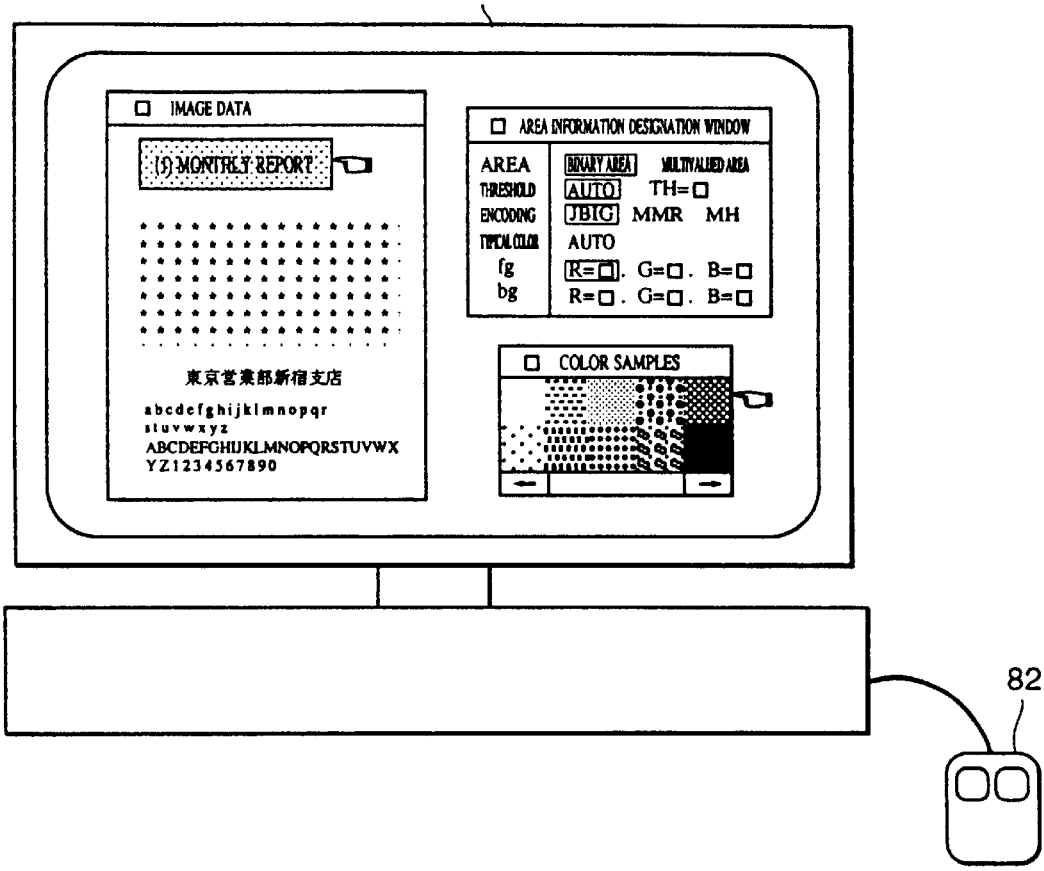
FIG. 8 shows how to designate typical color values and other parameters interactively.
FIG. 9 shows a structure of output data.

FIG. 7 shows the results of the binary transform involving a certain area and typical-color values of the area. When an area has only the two colors black and white, the typical-color values of the area need not be composed of averages of R, G, and B values of pixels but may be represented by an average of brightness (Y) values of pixels represented by binary digit 0s or binary digit 1s. Alternatively, as shown in FIG. 8, a user of the apparatus may designate any color tones as typical-color values interactively using the display 81 and operating unit 82 by, for example, selecting any of color samples appearing on the display 81.

The results of the binary transform thus obtained are then encoded in, for example, a JBIG, MMR, or any other binary encoding mode. Resultant coded data, and data of typical color values provided by the typical color value calculator 26 are supplied as output data concerning the area to the code memory 15 (29). The JBIG encoding and MMR encoding belong to the class of line-by-line reversible encoding.

Next, encoding of a multicolor area such as a natural-colored image in this embodiment will be described.

In this embodiment, data of a multicolor area is encoded in a multivalued encoding mode such as a JPEG encoding mode. Obtained coded data is supplied as output data concerning the area to the code memory 15 (29).

In this apparatus, the output unit 16 such as a transmitter, an image file, or the like, which is not shown, supplies coded data and typical-color value data (for bicolor areas) for the various areas, and structural information obtained through area identification as output data relative to input image data.

FIG. 9 shows a data structure of output data supplied from the image encoding unit in accordance with this embodiment. The output data starts with structural information 91 representing a positional relationship between areas and natures of areas; such as, those shown in FIG. 4. The structural information is succeeded by typical color value data 92. The typical color value data is succeeded by coded data of respective areas.

The coded data of areas may be padded with leading encoding mode discriminant information, for example, a 0 representing a so-called JBIG adaptive dynamic arithmetic encoding mode (hereinafter, JBIG encoding mode), a 1 representing an MMR encoding mode, and so on. The encoding mode discriminant information enables selective use of a plurality of encoding modes. In this embodiment, no particular restriction is placed on the data structure of output data.

Description of an Image Decoding Unit

An image decoding unit that inputs and decodes output data will be described below.

Figure 3:
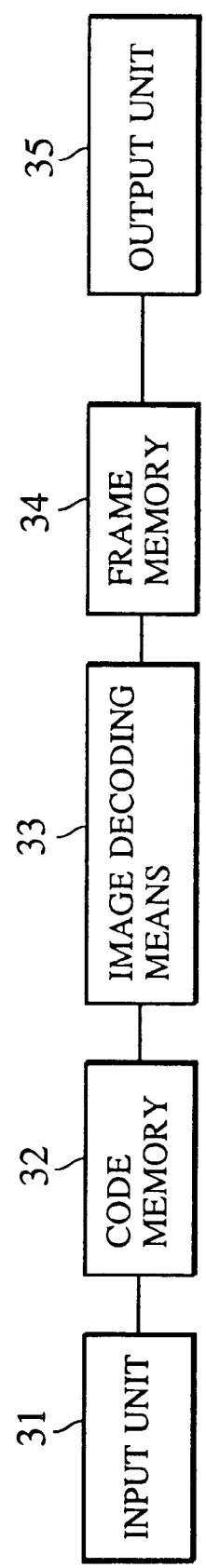
FIG. 3 is a block diagram showing an image decoding unit, which constitutes an image processing apparatus, in accordance with the embodiment of FIG. 1.

FIG. 3 is a block diagram showing an image decoding unit that constitutes an image processing apparatus of this embodiment. In FIG. 3, reference numeral 31 denotes an input unit for receiving or reading input coded data or for retrieving or inputting data from an external storage unit such as an magneto-optical disk. 32 denotes a code memory. 33 denotes an image decoding means for executing given decoding. 34 denotes a frame memory. 35 denotes an output unit for displaying or printing an image; such as, a display or a printer.

Figure 10:
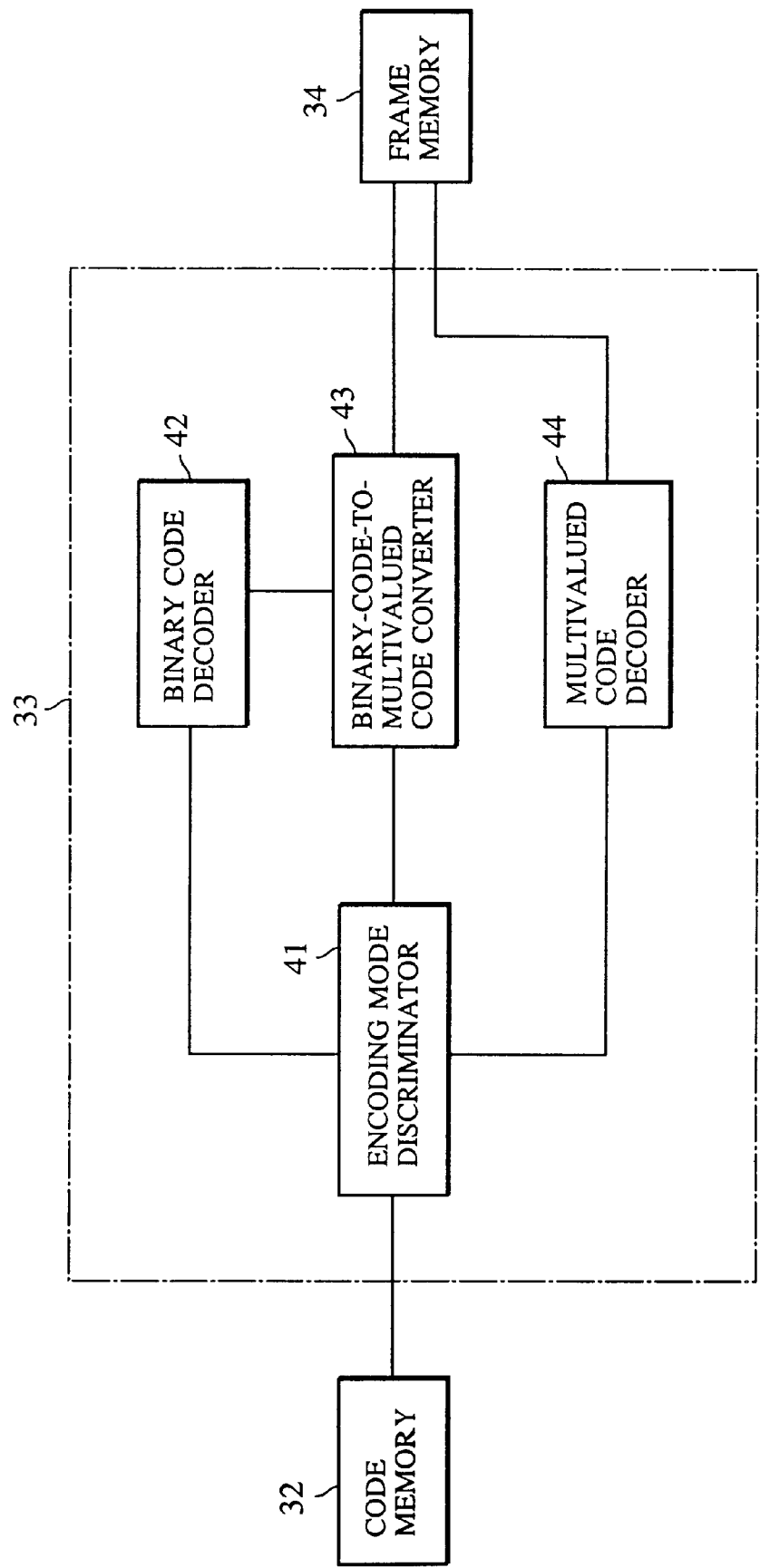
FIG. 10 is a block diagram showing circuitry of an image decoding means 33 shown in FIG. 3.

FIG. 10 is a block diagram showing a circuitry of the image decoding means 33 shown in FIG. 3. The code memory 32 shown in FIG. 10 stores coded data received from the input unit 31 or read from the external storage unit (not shown). An encoding mode discriminator 41 interprets discriminant information including structural information which is appended to coded data. 42 denotes a binary code decoder for decoding binary-coded image data. 43 denotes a binary code-to-multivalued code converter for converting a decoded binary image into a multivalued image. 44 denotes a multivalued code decoder for decoding multivalued coded image data. 34 denotes a frame memory comparable to the frame memory 34 shown in FIG. 3.

Image decoding to be executed by the image decoding means 33 will now be described.

To begin with, decoding of coded data resulting from binary encoding such as JBIG encoding or MMR encoding will be described. The encoding mode discriminator 41 interprets discriminant information concerning an encoding mode, executes decoding associated with the designated encoding mode, and provides binary image data. Using typical color values of an area which are appended to the coded data, the binary code-to-multivalued code converter 43 converts the binary image data into multivalued image data.

The binary code-to-multivalued code conversion will be described in conjunction with typical color values shown in FIG. 7.

As shown in FIG. 7, pixels represented by binary digit 1s are assigned typical color values (R, G, B)=(100, 200, 50), while pixels represented by binary digit 0s are assigned typical color values (R, G, B)=(0, 50, 200). Thus, a binary image is converted into a multivalued image. Herein, if brightness (Y) values are entered as typical values of an area, the area is recognized as a black-and-white binary area. Pixels represented by binary digit 1s are assigned (R, G, B)=(Y1, Y1, Y1), while pixels represented by binary digit 0s are assigned (R, G, B)=(Y0, Y0, Y0). Thus, a binary image is converted into a multivalued image. As for typical-color value data employed in this conversion, a user may designate any color tones interactively in the same manner as for typical-color value data employed in encoding.

As for coded data resulting from multivalued encoding such as so-called JPEG ADCT encoding, decoding is executed in the same mode as an encoding mode interpreted by the encoding mode discriminator 41 in order to provide multivalued image data.

Multivalued data of respective areas produced as mentioned above is developed in the frame memory 34 by a control circuit (not shown) according to structural information supplied together with the coded data. Image reconstruction is then executed, whereby multivalued data of a single image is output by means of the output unit 35 such as a printer or a display.

For handling superposed areas as shown in FIG. 6, hierarchical information representing a relationship between superposed areas and being appended to structural information is employed. Specifically, a character area is affixed to a natural-colored area. Thus, an image is reconstructed.

In the example shown in FIG. 5, a character area is affixed to a natural-colored area. As for the blank portion of the natural-colored area (corresponding to the character area), in whatever state the blank portion stays, image data of the character area is overwritten. Thus, the reproduced image is finalized.

As described above, according to the present embodiment, for encoding, areas of an input image are identified. A multivalued area is encoded in a multivalued encoding mode. As for a bicolor area, typical color values are computed on the basis of binary digits, and then encoded in a binary encoding mode. For decoding, multivalued coded data is decoded in a multivalued decoding mode. Binary coded data is decoded into multivalued data by transforming pixel values of a binary image resulting from binary decoding into associated typical color values. Image reconstruction is then performed according to structural information. Consequently, encoding efficiency for a binary area improves, thus realizing efficient encoding as a whole.

Superposition of areas is permitted for structuring, contributing to further improvement of encoding efficiency.

In the aforesaid embodiment, a color image composed of R, G, and B components is used as an input image. The present invention is not limited to a color space of R, G, and B but may apply to any other color space of, for example, Y, Cb, and Cr, or $L^*$, $a^*$, and $b^*$.

Encoding or decoding in accordance with this embodiment is adaptable to a monochrome variable-density image.

On the other hand, another area identification other than the one described above is available. For example, image data may be rendered on a display and then a user may designate areas interactively. Specifically, the area identifier 13 is replaced with a desk-top publishing (DTP) unit, so that a mouse or other pointing device is used to designate areas and execute software under the control of a CPU.

Figure 11:
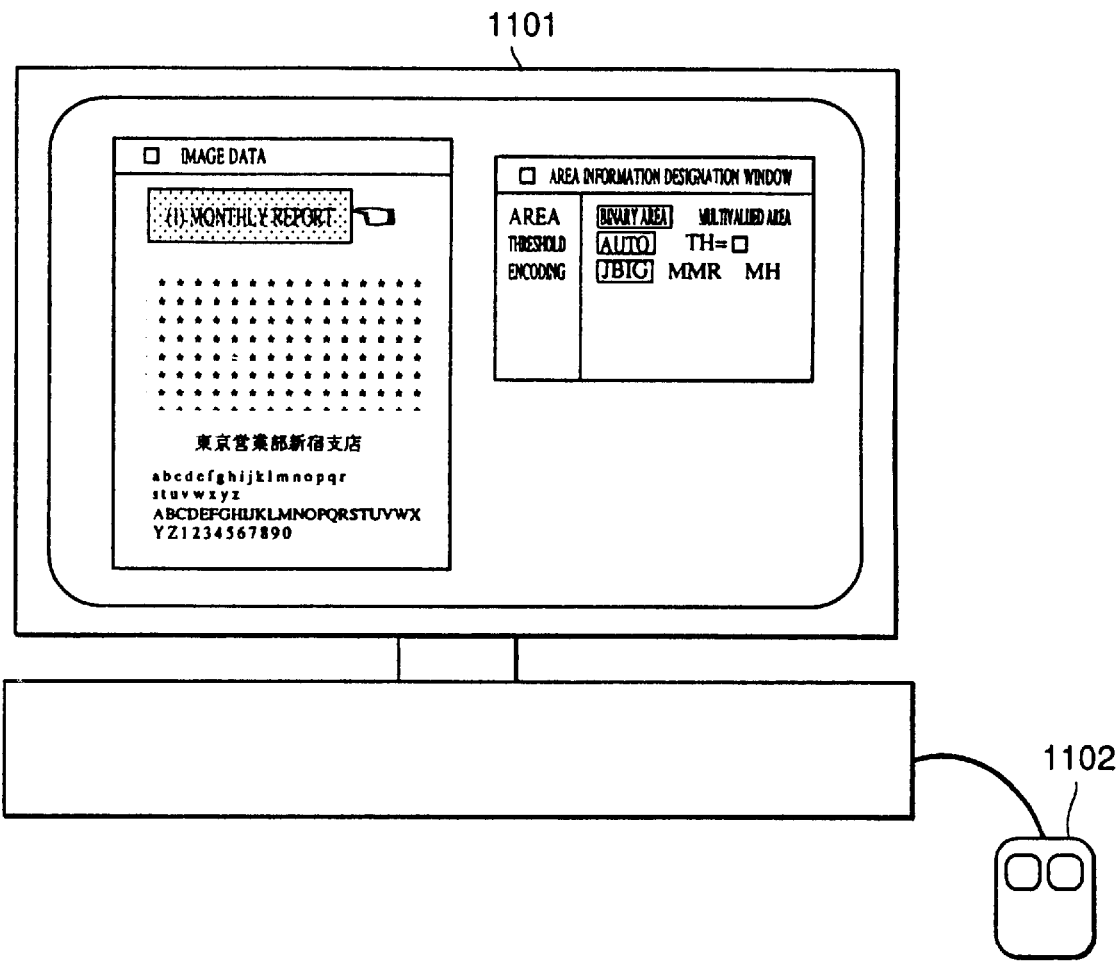
FIG. 11 shows an example of a system using a display.

FIG. 11 shows an example of a system using the foregoing display. In the system shown in FIG. 11, first, an input image is rendered on a display 1101. A user uses a mouse 1102 or the like to cut out rectangular ares of different natures including, for example, an area entitled as "(1) Monthly Report" in the upper left of FIG. 11, from the image. The nature of an area concerned such as a binary or multivalued area, and an encoding mode, for example, JBIG or MMR for binary encoding, are then designated. Encoding is then carried out according to the designated parameters. When areas are cut out, structural information representing the locations and sizes of the areas; such as, the one shown in FIG. 4, is described at the same time.

First Variant

In the aforesaid embodiment, superposition of areas is permitted for an image in which, as shown in FIG. 5, a character area is superposed independently on a natural-colored area. The image is then, as shown in FIG. 6, structured hierarchically.

Figure 12:
FIG. 12 shows an example of an image in which a natural-colored area is superposed on a character area.

This variant is concerned with processing of an image in which, as shown in FIG. 12, a natural-colored area is superposed on a character area.

Figure 13:
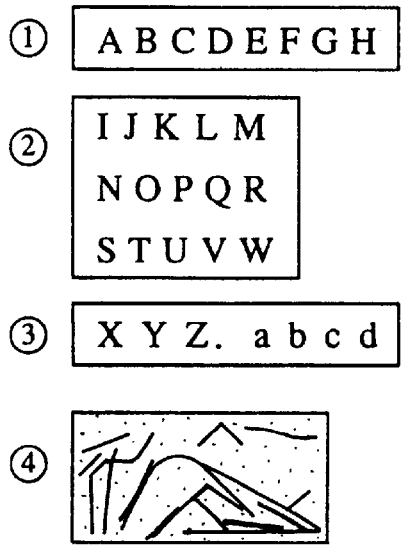
FIG. 13 shows examples of results of conventional structuring.

In the past, when an image in which a natural-colored area is superposed on a character area is to be structured, as shown, for example, in FIG. 13, the image has been divided into small areas. This results in an increased number of areas, degraded processing efficiency, or an increased quantity of encoding.

Figure 14:
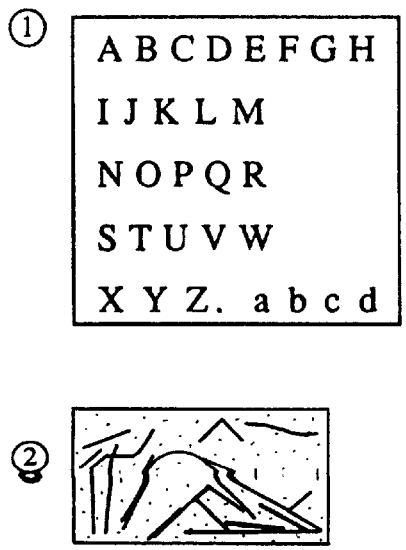
FIG. 14 shows examples of results of structuring for which superposition of image areas is permitted.

In this variant, superposition of areas is permitted. Then, as shown in FIG. 14, areas are cut out in order to structure the data. The cut-out natural-colored area is encoded in JPEG mode. The remaining character area is handled as described below.

The portion of the character area corresponding to the cut-out natural-colored area is padded with peripheral pixel values, for example, pixel values of the natural-colored area in a state immediately before the natural-colored area is switched to the character area or an average of pixel values of the natural-colored area abutting on the character area, in the course of scanning along boundaries between the areas. The character area is then transformed into binary digits and encoded in JBIG mode or the like. Hierarchical information representing a relationship between superposed areas; such as, information saying, for example, that a natural-colored area is affixed to a character area is appended to structural information.

In the stage of image reconstruction, decoded image data is reconstructed according to the structural information and hierarchical information. In this variant, according to the hierarchical information saying that a natural-colored area is affixed to a character area, a natural-colored area is affixed to a designated location of a character area. Thus, image reconstruction is achieved.

In this variant, an image in which a natural-colored area is superposed on a character area is used as an example of hierarchically structured data. This variant is not limited to this kind of image but may apply to a kind of image in which a character area colored differently or an area of a different nature is superposed on a character area.

Second Variant

Figure 15:
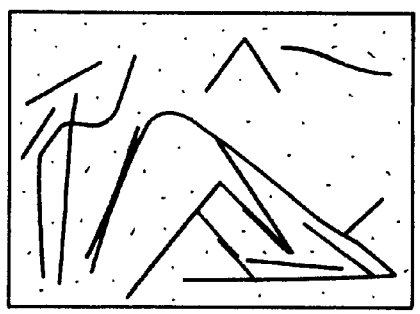
FIG. 15 shows an example of an image in which characters are superposed on a natural-colored area.

This variant is concerned with processing of an image in which, as shown in FIG. 15, a character area is superposed and dependent on a natural-colored image; that is, an image in which characters are rendered in the background of a natural-colored area.

Figure 16:
FIG. 16 shows an example of a result of conventional structuring.

For structuring such an image, as shown in FIG. 16, the whole natural-colored area including the character area has been handled as a natural-colored area in the past. This leads to the tendency toward deterioration of image quality, especially, of quality of characters.

Figure 17:
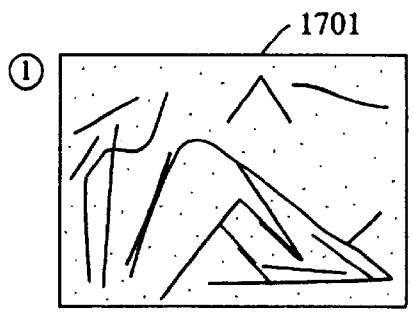
FIG. 17 shows examples of results of structuring in which superposition of image areas is permitted.
Figure 17:

In this variant, as indicated with reference numeral 1702 in FIG. 17, pixels of characters alone are extracted from a natural-colored area. A character area is then produced by representing, for example, pixels of characters by 1s (black) and other pixels by 0s (white). As for the natural-colored area from which characters are extracted, locations of pixels of characters may be padded with white (rendered by red, green, and blue valued 25), with surrounding pixel values; that is, pixel values of the natural-colored area in a state immediately before the natural-colored area is switched to the character area, or an average of pixel values of the natural-colored area abutting on the character area, in the course of scanning along the character area. Thus, the natural-colored area is completed. The entire image is then structured hierarchically. In this variant, an average of pixel values of characters is calculated and use as a typical color value of the character area.

As for hierarchical information representing a relationship between superposed areas, information saying that only the pixels of the character area represented by 1s (black) are affixed to the natural-colored area is appended to the structural information shown, for example, in FIG. 17. The character area is encoded in JBIG or any other binary encoding mode. The natural-colored area is encoded in JPEG or any other multivalued encoding mode.

In the stage of image reconstruction, decoded image data is reconstructed according to the structural information and hierarchical information. In this variant, according to the hierarchical information saying that only the pixels of the character area are extracted from the natural-colored area, pixels assigned the typical color value are affixed to designated pixel locations in the natural-colored area. Thus, image reconstruction is achieved.

Third Variant

Figure 18:
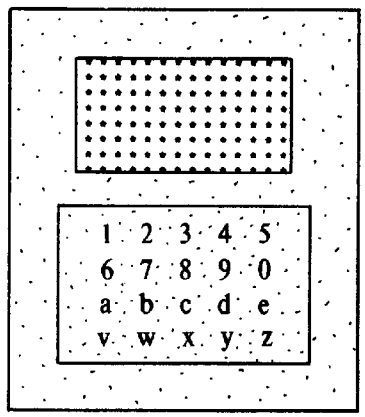
FIG. 18 shows an image and a base in accordance with the third variant.
Figure 19:
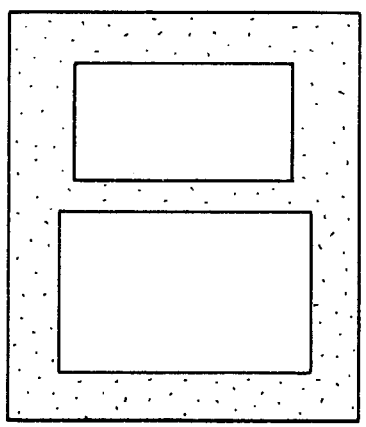
FIG. 19 shows areas of an image in accordance with the third variant.

The image encoding means 14 in the image encoding unit in accordance with the aforesaid embodiment specifies a typical color value for the base of an entire image. Therefore, an image whose base is, as shown in FIG. 18, tinted with any color can be processed in the same manner as that in the aforesaid embodiment.

Figure 20:
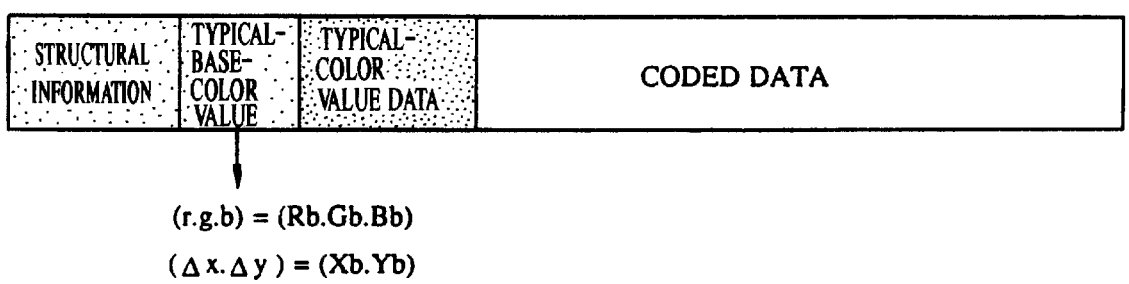
FIG. 20 shows an output containing a typical color value of a base in accordance with the third variant.
Figure 23:
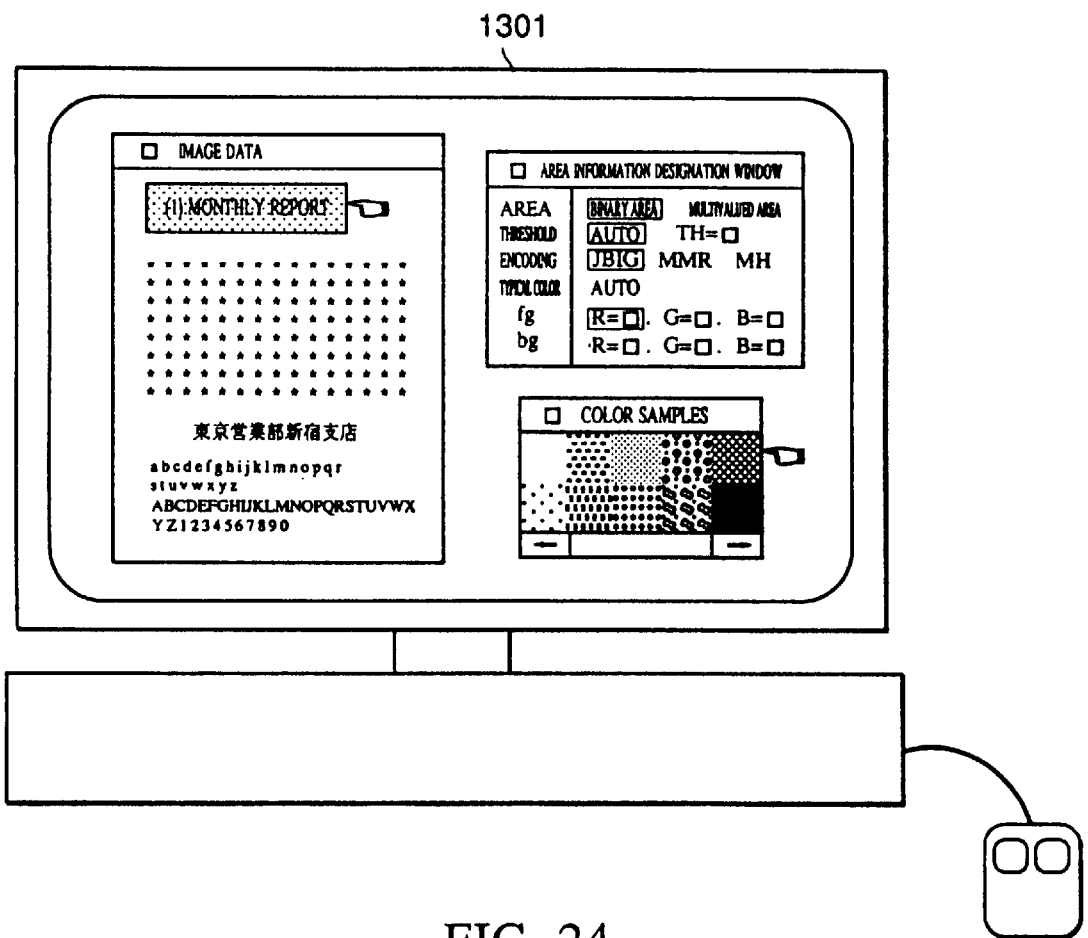
FIG. 23 shows how to select typical color values of an area in accordance with the sixth variant.

More particularly, for example, averages of R, G, and B values of pixels in a remaining area of an image from which areas are cut out are calculated in order to define a typical color value of a base. Alternatively, a user may designate a typical color value of a base interactively. The typical color value of a base is, as shown in FIG. 20, appended to output data, and then supplied.

In this variant, no limitation is imposed on the position at which the typical color value of a base is described. For example, the typical color value may be described as part of structural information or as part of typical color value data.

In the stage of image reconstruction, for example, base image data is produced according to the typical color value of a base. Produced multivalued data is then developed over the base image data according to the structural information. Thus, an image is reconstructed.

A white base may be regarded as a default, wherein no typical color value of a base is used. Moreover, data representing the size of an entire image may be output together with a typical color value of a base. For producing base image data in the stage of image reconstruction, the data representing size may be used. Furthermore, in the stage of image reconstruction, data representing a typical color value of a base or a size of an image may be modified by, for example, designating a new value. Thus, image reconstruction is achieved.

Fourth Variant

When transforming a bicolor area of image data into binary digits, the image encoding means 14 in the aforesaid embodiment allows the RGB-to-Y converter 24 to convert sets of R, G, and B values into brightness (Y) values, and transforms the brightness values into binary digits. The binary transform is not limited to this procedure. Alternatively, R, G, and B values may be transformed into binary digits, and then three binary images (three bit images) may be encoded independently.

To be more specific, for processing a bicolor area containing characters or drawings and being provided by the area identifier 13, R, G, and B values are transformed into binary digits in order to produce three binary images (three bit-images). Thresholds for use in binary transform may be obtained from histograms in the same manner as the one in the aforesaid embodiment. Alternatively, a user may designate them interactively.

Using the resultant binary digits, as shown in FIG. 21, a typical color value is computed for each of pixels whose R, G, and B values are represented by binary digits 0 and 1s. This typical color value computing is performed in the same manner as that in the aforesaid embodiment. Three binary images thus produced are encoded in JBIG, MMR, or any other encoding mode. The coded data and the computed typical color values are supplied as output data concerning the bicolor area to the code memory 29.

Fifth Embodiment

In the aforesaid embodiment, an attempt is made to adapt image encoding not only to a bicolor image but also to an area that can be rendered in less than eight colors; such as, a graph. For handling an area that can be rendered in less than eight colors; such as, characters or a graph and that is provided by the area identifier 13, R, G, and B values are transformed into binary digits in order to produce three binary images (three bit-images). Thresholds for use in binary transform may be obtained from the histograms concerning the R, G, and B values in the same manner as the one in the aforesaid embodiment. Alternatively, a user may designate them interactively.

In this variant, binary digits (three bits of data) are used to compute a typical color value for each of pixels whose R, G, and B values are represented by 0s and 1s. Consequently, eight typical color values are, as shown in FIG. 22, associated with combinations of binary digits (three bits). As a result, an area rendered in less than eight colors can be reconstructed. The procedure of typical color value computing is identical to that in the aforesaid embodiment.

Even in this variant, three binary images thus produced are encoded independently in JBIG, MMR, or any other encoding mode. The coded data and the calculated typical color values are supplied as output data concerning the area to the code memory 29.

As for combinations of three binary digits (bits), a user may designate (100, 150, 200) for (0, 0, 0), (10, 100, 160) for (0, 0, 1), and so one and thus can uniquely associate the combinations with eight typical color values.

Sixth Variant

For computing typical color values of an area in the aforesaid embodiment, binary digits representing pixels of the area are used to obtain associated typical color values. This variant enables a user to designate typical color values for an area interactively.

For an area of input image data identified as a character (binary) area, a cut-out area is transformed into binary digits and encoded in JBIG mode in the same manner as that in the aforesaid embodiment. In this stage, a user designates any typical color values by, for example, selecting any color tones from color samples appearing on the display 1301 or entering sets of R, G, and B values.

For setting typical color values, the procedure may be changed from area to area. That is to say, for a certain area, a user designates typical color values. For another area, typical color values are computed automatically in the same manner as those in the aforesaid embodiment. As for a typical color value of a base, similarly to the third variant, a user may define it interactively.

Seventh Variant

In the seventh variant, the encoding technique in accordance with the aforesaid embodiment is adapted to data produced by DTP.

Figure 24:
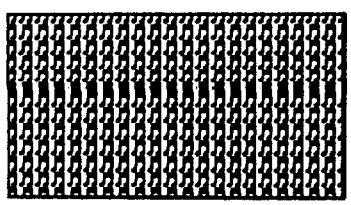
FIG. 24 shows image data containing input character data produced through DTP in accordance with the seventh variant.

For example, image data is, as shown in FIG. 24, produced by DTP. As for input character data shown in the upper part of FIG. 24, coded data of characters is developed over image data and thus encoded in a binary encoding mode. Color information concerning characters and a color of a background of the characters, which is designated at the time of entering the characters, is used as typical color values of each area (in the example shown FIG. 24, a typical color value of characters is designated as (r, g, b)=(0,0, 255), and a typical color value of the background of the characters is designated as (r, g, b)=(255, 0, 0)).

As shown in the lower part of FIG. 24, natural-colored data affixed by fetching it using a scanner; such as, a photograph is encoded in JPEG or any other multivalued encoding mode. As for a graph or any other user-created color data, for example, a bar graph having eight colors, each color is represented by three bits. This means that an area containing the bar graph can be represented by three bits. The area is encoded in a binary encoding mode in units of a set of three bits or binary digits. Color information associated with combinations of three bits is regarded as typical color value data. For example, (0, 0, 1) is associated with (r, g, b)=(100, 20, 200).

Eighth Variant

For computing typical color values of an area in the aforesaid embodiment, binary digits concerning the area are used to obtain associated color values of pixels. In this variant, a typical color value of a base described in conjunction with the second variant is used as a typical color value of a background (for example, an area whose pixels are represented by binary digit 0s) of an area.

Figure 25:
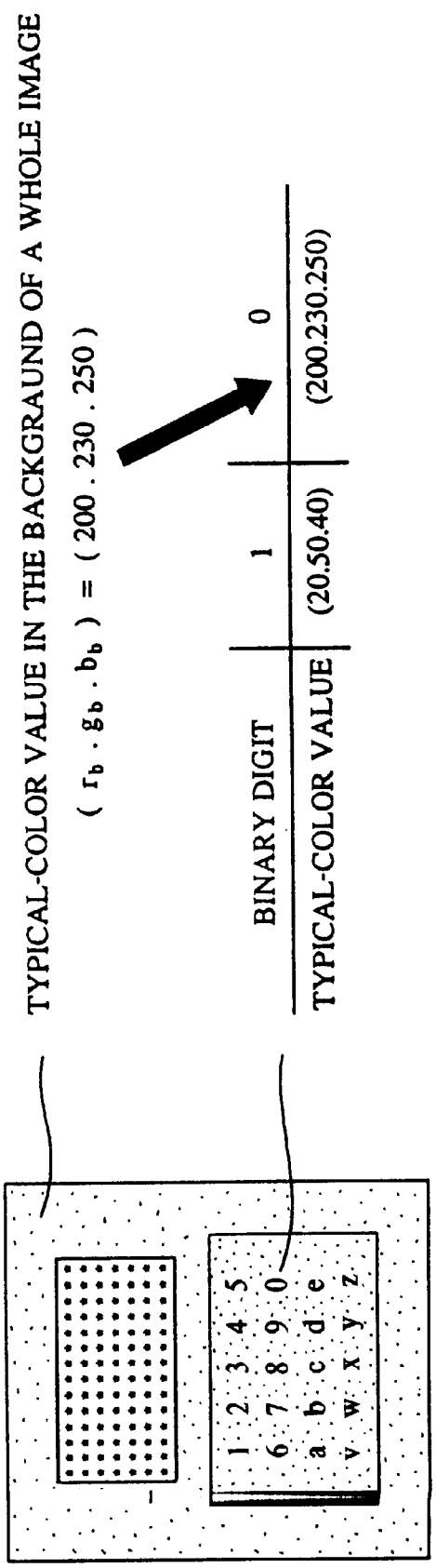
FIG. 25 shows how to compute typical color values in accordance with the eighth variant.

For example, when an image whose background has, as shown in FIG. 18, any color is entered, a typical color value associated with the binary digit 0 is, unlike the aforesaid embodiment, designated as shown in FIG. 25 but not computed using color values of pixels.

Consequently, color mismatch between an area and a background, which is likely to occur in case the area is reproduced using typical color values computed using color values of pixels, can be avoided.

Ninth Variant

The technique of transforming binary data into multivalued data during image decoding employed in the aforesaid embodiment uses input typical color values associated with coded data. In this variant, a user designates typical color values of an area interactively at the time of decoding.

According to this variant, when an image is reconstructed according to input coded data and structural information, an area encoded in JBIG or any other binary encoding mode is decoded in the same mode as that for encoding in order to produce binary image data. For the produced binary image data, a user designates typical color values, to which binary image data is to be transformed, by selecting color samples or sets of R, G, and B values on a display. Based on the typical color values, the produced binary image data is decoded into multivalued data. Thus, the image is reproduced.

Coded data encoded in a multivalued encoding mode is decoded similarly to that in the aforesaid embodiment. Multivalued data produced for each area is used to reconstruct an image according to structural information. Finally, a reconstructed image is output.

According to this variant, coded data can be displayed on a color DTP unit and used for editing. Furthermore, this variant can presumably apply to a working mode in which typical color values of an area are specified in the stage of output (decoding or reproducing) but not specified in the stage of input (encoding), as well as to a working mode in which typical color values of an area are specified in the stage of input and modified and used for reproducing in the stage of output.

Typical-color values of a certain area may be designated by a user at the time of decoding (reproducing), while for another are, typical-color values may be specified using computed or designated values. Thus, a procedure of setting typical-color values may be different from area to area. Since typical-color values of an area can be modified to any values afterward, input data processed as a color image may be used to reconstruct a black-and-white variable-density image, or vice versa.

As for a typical-color value of a base, a user may define any value interactively at the time of decoding (reconstruction) similarly to that in the third variant.

Tenth Variant

When coded image data is reconstructed according to structural information in accordance with the aforesaid embodiment, a user may be allowed to rewrite the structural information and thus modify the locations and sizes of areas.

As mentioned above, multivalued image data is divided into a plurality of areas and structured. The image data can therefore be processed optimally for the respective areas of different natures. In particular, an optimal encoding technique can be selected for each area. Consequently, image degradation can be suppressed and efficient encoding can be realized.

Since superposition of areas is permitted, multivalued image data can be structured hierarchically. This facilitates processing and editing.

Area information is held as location information and size information relative to a screen. This results in a reduced amount of area information.

In the aforesaid examples, areas are provided as rectangular areas. Alternatively, areas may be shaped like circles or ellipses.

Furthermore, encoding of binary image data is not limited to the aforesaid encoding that is performed in units of pixel data. Alternatively, techniques of character recognition, well known in the art, may be employed in encoding of binary image data into character codes. In this case, reversible encoding can be realized by extracting character codes, their colors, and a background color.

The present invention may be applied to a system composed of many equipment including a scanner, a host computer, a printer, and a communication device or to a stand-alone apparatus. Needless to say, the present invention can also apply to a system or an apparatus in which software programs are implemented.

As described so far, according to the present embodiment, an image is cut into areas of different natures which are permitted to be superposed mutually. An optimal encoding technique is selected for each area according to the nature of the area. This enables hierarchical structuring of data. Consequently, image quality of characters is upgraded outstandingly and encoding efficiency improves.

Information of typical color values of a given area is appended to data produced by encoding binary data. During decoding, decoded binary-coded data is transformed into multivalued data using typical color values and thus a multivalued image is reconstructed. Even unclear characters and color characters can be reproduced with greater faithfulness to an original image.

A bicolor area that is not a black-and-white area will not be treated as a multivalued image but as a binary image. This results in a markedly reduced amount of processing data. Eventually, degradations in image quality resulting from encoding or decoding can be minimized drastically.

The present invention is not limited to the aforesaid embodiments but can be modified into or adapted to a variety of working modes without departing from the scope defined by the appended claims. The aforesaid embodiments and variants can be implemented in combination.

What is claimed is:

1. An image processing apparatus comprising:
   input means for inputting multi-level image data indicative of a composite image including a first image having a first characteristic, a second image having a second characteristic and a background image;
   judging means for judging a first area where the first image exists, a second area where the second image exists and a third area where the background image exists based on content of the composite image represented by the multi-level image data, with the first area and the second area being overlapped and the third area being exclusive of the first and second areas;
   generating means for generating information indicative of a superposed relation of the first area and the second area in accordance with the judgment result of said judging means;
   first encoding means for encoding the image data of the first area by a first encoding method;
   second encoding means for encoding the image data of the second area by a second encoding method;
   third encoding means for encoding the image data of the third area by a third encoding method; and
   transmitting means for forming and transmitting output data, the output data including the information generated by said generating means, the image data of the first area encoded by said first encoding means, the image data of the second area encoded by said second encoding means, and the image data of the third area encoded by said third encoding means.

2. The apparatus of claim 1, wherein the first characteristic is indicative of a character or a drawing.

3. The apparatus of claim 1, wherein the second characteristic is indicative of a natural-colored image.

4. The apparatus of claim 1, wherein the information indicative of a superposed relation represents one of the first area being superposed on the second area, and the second area being superposed on the first area.

5. The apparatus of claim 1, wherein the output means outputs further information indicative of a relative position of the first area and the second area.

6. The apparatus of claim 1, wherein the first encoding method is a loss-less encoding method for encoding a binary image.

7. The apparatus of claim 1, wherein the second encoding method is a lossy encoding method for encoding a multi-level image.

8. An image processing method comprising:
   an inputting step of inputting multi-level image data indicative of a composite image including a first image having a first characteristic, a second image having a second characteristic and a background image;
   a judging step of judging a first area where the first image exists, a second area where the second image exists and a third area where the background image exists based on content of the composite image represented by the multi-level image data, with the first area and the second area being overlapped and the third area being exclusive of the first and second areas;
   a generating step of generating information indicative of a superposed relation of the first area and the second area in accordance with the judgment result of said judging step;
   a first encoding step of encoding the image data of the first area by a first encoding method;
   a second encoding step of encoding the image data of the second area by a second encoding method;
   a third encoding step of encoding the image data of the third area by a third encoding method; and
   a transmitting step of forming and transmitting output data, the output data including the information generated by in generating step, the image data of the first area encoded in said first encoding step, the image data of the second area encoded in said second encoding step, and the image data of the third area encoded in said third encoding step.

* * * * *

UNITED STATES PATENT AND TRADEMARK OFFICE
CERTIFICATE OF CORRECTION

PATENT NO.   : 5,933,249
DATED        : August 3, 1999
INVENTOR(S)  : NORIO SHIMURA ET AL.

It is certified that error appears in the above-identified patent and that said Letters Patent is hereby corrected as shown below:

COLUMN 7

Line 45, "ares" should read --areas--;
   Line 46, "as" should be deleted;
   Line 53, "areas; such as," should read --areas such as--.

COLUMN 12

Line 10, "are," should read --area,--;

COLUMN 14

Line 41, "by in" should read --in said--.

Signed and Sealed this

Twenty-second Day of August, 2000

Attest:

Q. TODD DICKINSON

Attesting Officer     Director of Patents and Trademarks